United States Patent [19]
Goodson

[11] 3,763,577
[45] Oct. 9, 1973

[54] ELECTRONIC TEACHING AID

[76] Inventor: David R. Goodson, 7581 Palos Verdes Dr., Goleta, Calif. 93017

[22] Filed: Jan. 26, 1972

[21] Appl. No.: 220,742

[52] U.S. Cl. ............................................... 35/48 R
[51] Int. Cl. ............................................ G09b 5/00
[58] Field of Search ..................... 35/9 R, 9 B, 48 R

[56] References Cited
UNITED STATES PATENTS

| | | |
|---|---|---|
| 2,562,179 | 7/1951 | Dorf.................................... 35/48 R |
| 2,654,163 | 10/1953 | Reynolds............................. 35/48 R |
| 3,118,236 | 1/1964 | Van Hemel.......................... 35/48 R |
| 1,153,737 | 9/1915 | Van der Hoorn et al............. 35/9 R |

OTHER PUBLICATIONS

Build With IC's "Electronic Umpire" by E. Miller Radio–Electronics December 1970.

*Primary Examiner*—Robert W. Michell
*Assistant Examiner*—J. H. Wolff
*Attorney*—David R. Goodson

[57] ABSTRACT

A portable teaching aid for school use which determines first student response to questions asked by the teacher by having the students depress electrical switches. The signal from the first switch depressed is fed into a control console containing a latching, exclusive or-gate. The gate lights a lamp on the control panel corresponding to the switch depressed and prevents any further responses after the first response from being indicated. A bell may be provided to ring with the first response. The circuit used does not need the conventional cross-circuiting using transistors and diodes to achieve the exclusive-or function. Silicon controlled rectifiers (SCR's) share a common-cathode resistor which produces a threshold voltage when any one SCR is triggered into conduction. This voltage raises the firing threshold of the non-conducting SCR's above the available trigger voltage producing the exclusive-or (lock-out) condition.

5 Claims, 3 Drawing Figures

PATENTED OCT 9 1973          3,763,577

ELECTRONIC TEACHING AID

The invention relates to an electrical teaching aid for schools which determines the first student response to a question asked by a teacher. When the student recalls the answer, he pushes an electrical switch to gain recognition. If he has pushed his switch first, his indicator lamp on the teacher's console will light and remain lit and a bell ring. Any other swtiches pushed after his will not register, even when the next switch pressed follows his within microseconds.

Although similar systems have been devised for use on television quiz shows and for vending machines, they have the disadvantages of not being portable, costing too much because of complex electronic, electrical or mechanical design and having poor reliability in the case of the mechanical lock-out.

Figure 1:
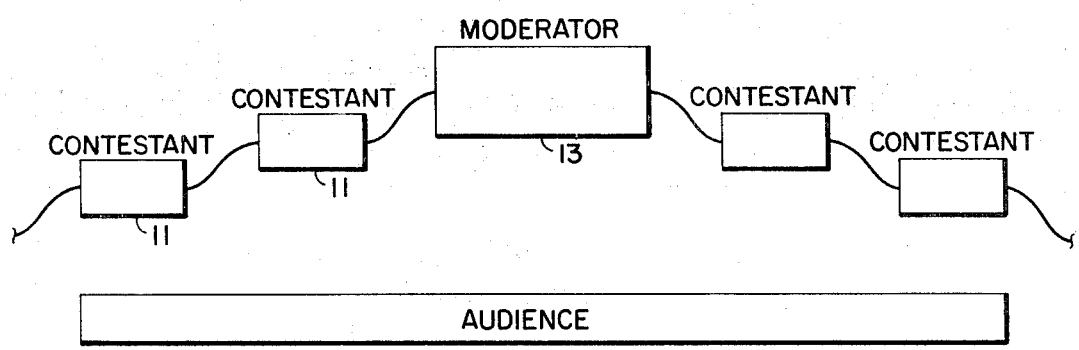
Figure 2:
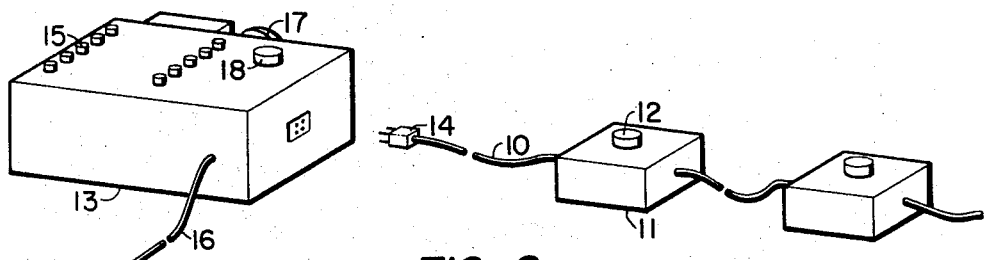
Figure 3:
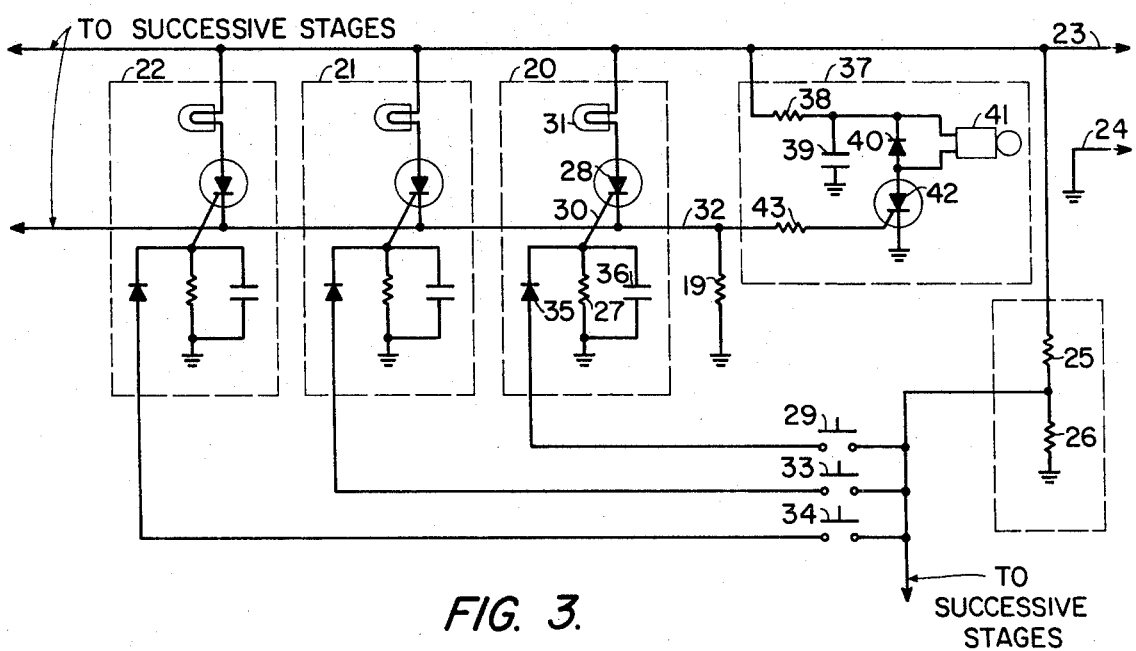

This invention overcomes all these disadvantages and the full significance of the invention will be appreciated when the detailed written description is read in conjunction with the drawings wherein:

FIG. 1 shows a typical setup for using the invention;
FIG. 2 shows a typical packaging of the invention;
FIG. 3 is a schematic diagram of the invention's circuit.

Referring to FIG. 2, the cordset 10, on which boxes 11 housing player switches 12 are wired, are connected to the control console 13 by means of an electrical pulg 14. Lights 15 on the console correspond to the individual player switches. A power cord 16 brings line power into the console which is stepped down, rectified and filtered. The bell 17 is mounted on the outside of the console box. Reset switch 18 is depressed to return all SCR's to a non-conducting state.

FIG. 1 shows how this invention would be used in a typical classroom. The control console 13 is placed by the teacher on a small table or podium and each student receives a switch box 11 to signal his/her response.

With the exception of resistor 19 and the bell circuit 37, the circuit shown in FIG. 3 appears to be a typical bank of SCR lamp drivers 20, 21, and 22 which are identical in circuitry and parts values.

Applying filtered direct current to points 23 and 24, with 23 positive and 24 negative, any SCR lamp driver 20, 21 and 22 triggered into conduction will remain on after the triggering voltage is removed.

The circuit produces two types of lock-outs: excludes all but the first response; excludes all responses in the event of a tie. The first type of lock-out, which is the desired lock-out condition for using the invention, occurs when any SCR lamp driver 20, 21 or 22 is triggered into conduction. Assume that all SCR's are non-conducting and that switch 29 closes. A positive trigger voltage is applied to the gate 30 of SCR 28 with the level being determined by the voltage divider composed of resistors 25, 26 and the gate resistor 27. The current through triggered SCR 28 and lamp 31 also flows through resistor 19 producing a positive threshold voltage 32 common to all cathodes of the SCR lamp drivers 20, 21 and 22. Since the gate must be made positive with respect to the cathode of an SCR to trigger it, no further responses can be registered as the cathodes of all the lamp drivers have become more positive than the available trigger voltage source. Diode 35 prevents the high positive voltage at the gate 30 of the triggered SCR 28 from reaching the gates of the non-conducting SCR's should the trigger switches 29, 33 and 34 be held closed. Capacitor 36 suppresses noise which can be picked up and cause random triggering when long lengths of unshielded cable are used between the trigger switches and the SCR's.

It should be apparent that increasing the fixed trigger voltage level would allow more than one SCR to trigger until enough voltage has developed across resistor 19 to produce lock-out. Thus, the circuit could be adjusted to allow a fixed number of SCR's to trigger and then lock-out the remaining ones. This alone would not show in which order the responses came in, such as first, second, third, etc., but three gates of this type could be combined to choose first and second place between two other gates.

The second lock-out condition which excludes all responses occurs when two or more switches are closed at the same time. Since the gate resistor 27 forms part of the trigger voltage divider, an additional gate resistor in parallel would further cut the trigger voltage down to a level too low to grigger either SCR. However, as the switches were opened, the last switch to remain closed would then trigger its SCR. In tests of many prototypes, this tie condition could only be achieved by closing two or more trigger switches and then applying power to the circuit; a tie condition could not be acheived under normal usage using ten lamp drivers in the gate as the response time of the circuit was so much faster than the students' reaction time.

Although the circuit shows three SCR lamp drivers, a minimum of two to an unlimited maximum of lamp drivers may be used.

The bell circuit 37 is composed of charging resistor 38, storage capacitor 39, supression diode 40, electromechanical bell 41, bell SCR 42, and gate resistor 43. When a lamp driver has been triggered, the threshold voltage 32 at resistor 19 triggers the bell SCR 42 discharging capacitor 39 into the bell 41 causing it to ring once. Since the bell SCR 42 remains on, resistor 38 is choosen to be high enough in value to prevent further ringing, but low enough to provide a fast recharge time (less than two seconds) when the circuit is reset.

To reset both the lamp drivers and the bell driver to a non-conductive state, the power is momentarily interrupted.

From the above it is apparent that this teaching aid is unique and uses a unique circuit concept to provide the latching, exclusive or-gate function using a minimum of parts allowing low cost construction and small size enabling it to be used in the teaching enviroment of all schools.

The invention as disclosed is by way of illustration and not limitation and may be modified in many aspects all within the scope and spirit thereof:

I claim:

1. In an educational device for determining, latching and visually displaying the first response of a group of quiz contestants the improvement comprising:
    a. a two wire input power source,
    b. a plurality of silicon controlled rectifiers each having an anode, a cathode and a gate lead,
    c. a corresponding plurality of gate resistors,
    d. wiring means connecting the common input line of said power source to one end of all of said gate resistors,
    e. wiring means connecting the other end of each of said gate resistors to the gate lead of its corresponding silicon controlled rectifier, f. wiring means connecting the anodes of each of said silicon controlled rectifiers to one terminal of a two terminal signal light, the other terminal of the two terminal signal light being connected to the positive input line of said power source, g. wiring means connecting the cathodes of each of said silicon controlled rectifiers to a threshold voltage line, said threshold line having a positive voltage determined by the combined voltage drop of the signal lamp and its associated silicon controlled rectifier so that the resultant threshold voltage is sufficient to set up a trigger voltage and activate the gate of a silicon controlled rectifier in a cooperating bell circuit, h. a voltage divider connected between said positive and common input lines for generating an intermediate trigger voltage output, i. a corresponding number of normally open single pole single throw switch as, each switch being connected by wiring means between the said trigger voltage output and the corresponding one of the other ends of each of said gate resistors with each said switch being actuatable by a contestant to indicate his response, j. a corresponding number of diodes connected by wiring means between said trigger voltage output and the corresponding one of the other ends of each of said gate resistor, respectively, so as to isolate the positive voltage at the gate of a triggered silicon controlled recifier from all other gates, k. a gate voltage threshold setting resistor having one end connected to said common input line and the other end connected to the threshold voltage line, said gate voltage threshold resistor further being connected to a bell circuit, whereby closure of any of said switches causes substantially immediate firing of the cooperating silicon controlled rectifier, causes the appropriate signal lamp to glow and produces a positive voltage at the cathodes of all silicon controlled rectifier through the threshold setting resistor effective to raise the firing voltage threshold of all remaining silicon controlled rectifiers so they cannot be triggered into conduction and also actuates the bell circuit.

2. The circuit of claim 1 wherein said gate voltage threshold resistor is lowered in value whereby a predetermined plurality of responses is indicated without regard to priority within the group.

3. The circuit of claim 1 wherein said trigger voltage source comprises two resistors arranged as a voltage divider with one side of one resistor connected to the positive line and the other side connected to any of said gate resistors.

4. The circuit of claim 3 wherein the voltage produced by the divider when 2 or more gate resistors are connected in parallel through the simultaneous closing of said switches is below the firing threshold of any silicon controlled rectifier.

5. The circuit of claim 1 comprising in addition capacitors across said gate resistors effective to cancel superious noise pulses.

* * * * *